United States Patent Office 2,995,693
Patented Aug. 8, 1961

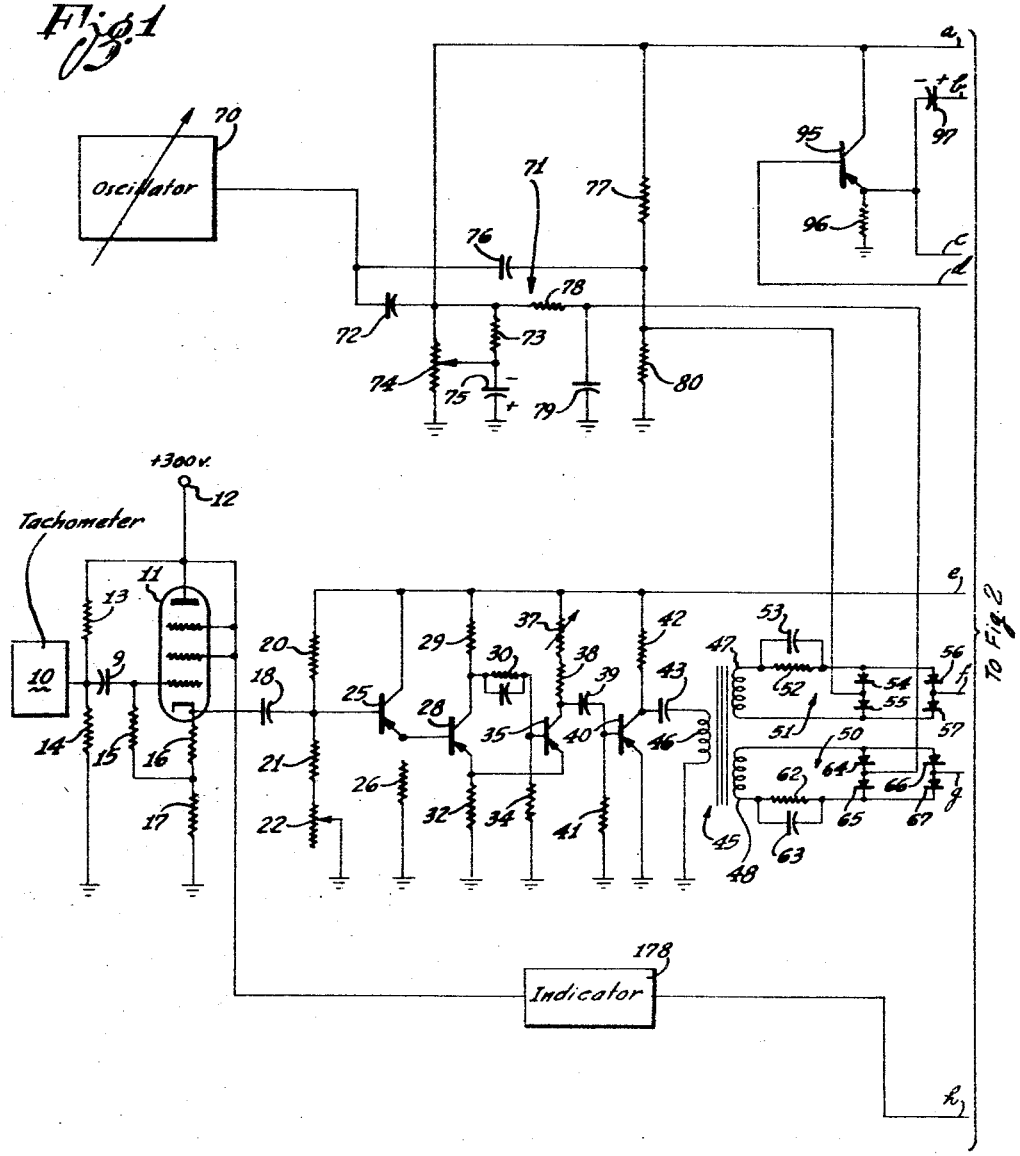

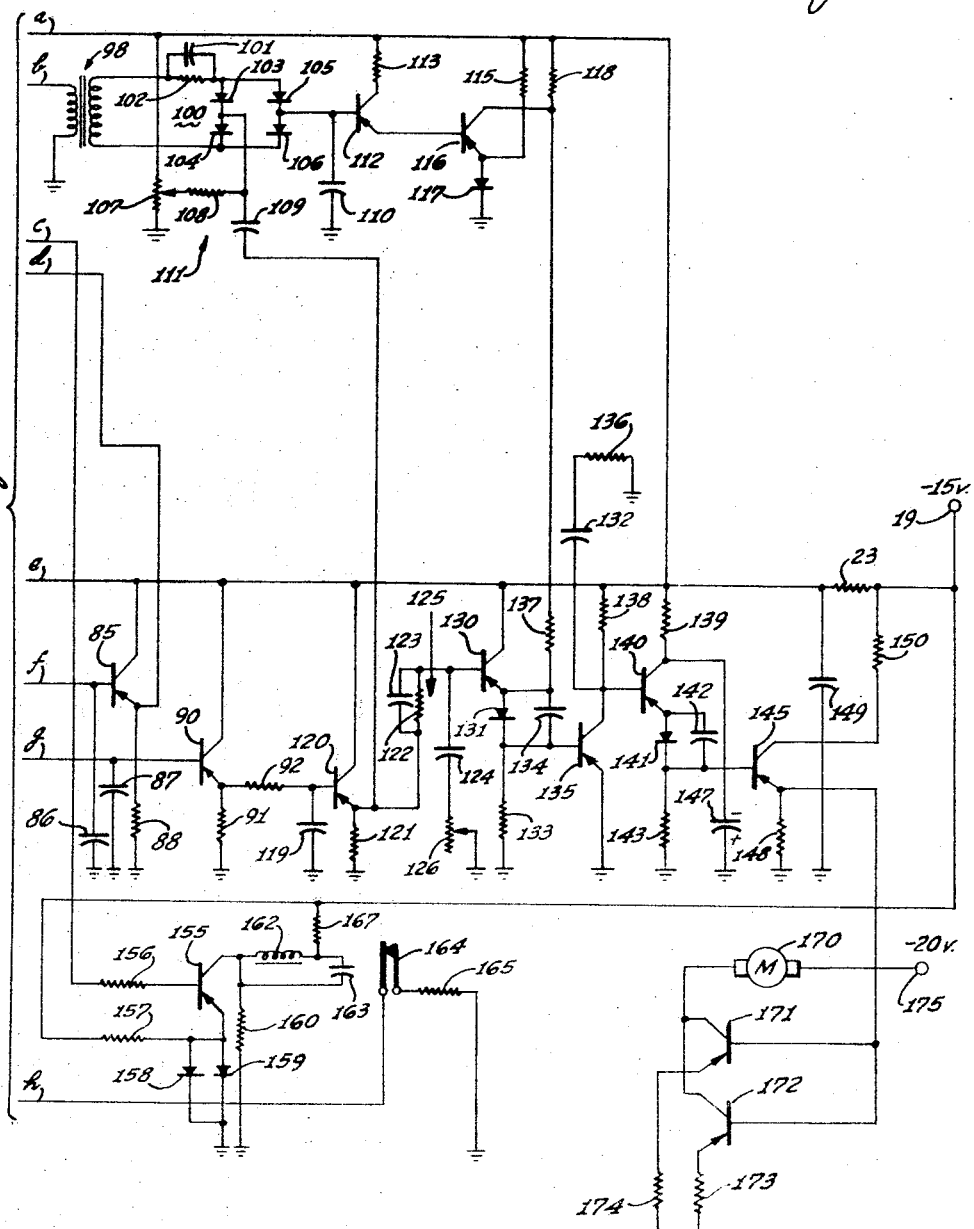

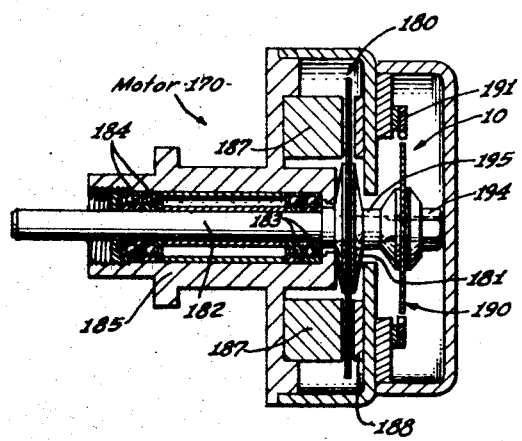
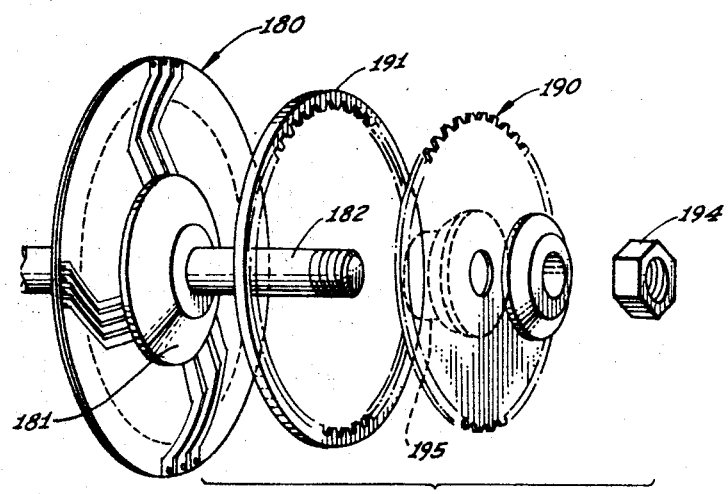
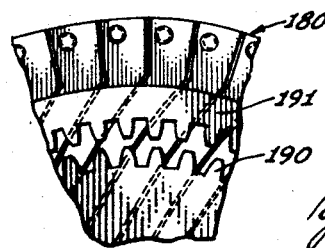

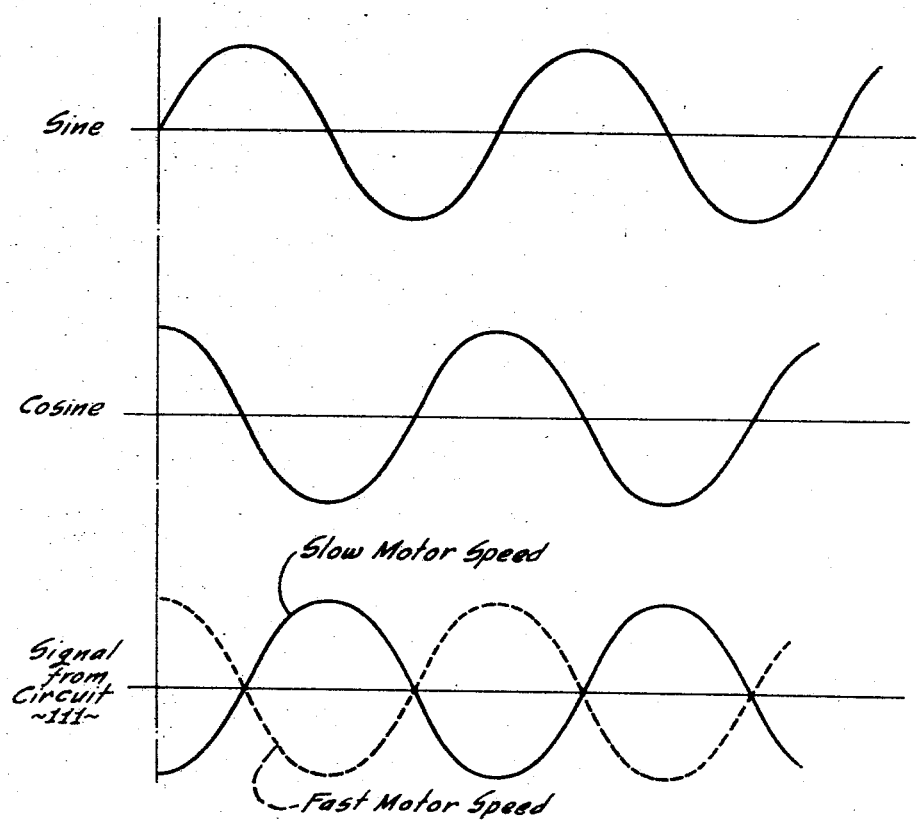

2,995,693
CONTROL SYSTEM
Wayne R. Johnson, Los Angeles, Calif., assignor to Minnesota Mining and Manufacturing Company, St. Paul, Minn., a corporation of Delaware
Filed Feb. 2, 1960, Ser. No. 6,134
11 Claims. (Cl. 318—314)

This invention relates to speed control and regulating circuits and more particularly to such circuit for rigorously controlling the speed of an adjustable electric motor.

There are many applications in which it is important to provide a rigorously constant speed electric drive. For example, in recording and reproducing television signals, radar signals, telemetering signals and the like, short period variations in speed result in phase or angular modulation of the signals. Such variations may either be in the form of drift in the same speed direction or in the form of oscillations in speed about the desired operating speed. Either of these variations may destroy the usefulness for the recording or reproduction.

Various methods have been used to compensate for and minimize the phase modulation resulting from speed variation of an electric drive. Generally, these methods involve the use of a feedback system which varies the effective torque of a synchronous alternating current drive by developing an error signal proportional to the change in speed of the drive from a reference speed. These drives are bulky and expensive and introduce a flutter component to the signals due to the inertia or response time delay of the motor. Shunt type direct current motors are light, reliable and inexpensive but their speed varies readily with every variation in load and even more complex regulating equipment has been required for them than for the synchronous drives.

In a specific illustrative embodiment of this invention a direct current motor is utilized and a very rigorous constant speed is achieved for any speed in a range of speeds without requiring complex and expensive regulating equipment. A variable frequency source is utilized to control the speed of the motor, with the motor tracking any frequency change of the source.

The motor is a low inertia, fast response D.C. motor having a printed armature of substantially zero inductance to provide for a zero electrical time constant. By utilizing such a quick responding motor flutter or small cyclical variations of the motor speed when the motor is under load can be avoided. The variable frequency source is a relatively high frequency source, and a tachometer generator driven by the motor provides a corresponding, nominally the same, high frequency signal. The tachometer signal is introduced to a squaring trigger circuit and then the square wave signal is introduced to a differentiating transformer.

The transformed drives two similar phase comparators effectively enabling them for a brief interval during each cycle of the tachometer signal. The signal from the reference source is applied to a phase shifting circuit which develops two quadrature signals and applies them respectively to the two phase comparators. The quadrature signals which are referred to as sine and cosine reference signals are effectively sampled by the differentiated pulses if the motor is not exactly at its operating speed. If the motor is exactly on operating speed, the differentiated pulses coincide with the cross-over point of the sine signal so that the output from the respective comparator remains constant and at zero volts.

When the motor is off speed the output of each comparator is a beat frequency signal varying at the beat frequency between the tachometer signal and the two quadrature reference signals. The cosine beat signal is introduced to another comparator which compares the phase of the cosine beat signal with that of a derivative of the sine beat signal. The sine beat signal is provided to a differentiating circuit converting it to a cosine signal which is in phase or out of phase with the cosine beat signal depending upon the direction of the speed variation of the motor.

The output of this latter phase comparator is added to the sine beat signal. A composite signal is in this manner developed indicating both the magnitude and direction of the motor speed variation. Because of the accurate speed variation determination and the rapid response of the motor, flutter is avoided.

Further features of this invention pertain to the provision of means for compensating for any difference in motor response at different speeds. The sine beat signal is coupled through a compensating network before being added to the direction indicating signal.

Still other features of this invention relate to the provision of indicating means providing an indication of the magnitude of the motor speed variation.

Further advantages and features of this invention will become apparent upon consideration of the following description when read in conjunction with the drawing wherein:

FIGURES 1 and 2, with FIGURE 2 arranged to the right of FIGURE 1, and a circuit representation of the motor control circuit of this invention;

FIGURE 3 is a sectional view taken through the motor utilized in the motor control circuit of this invention;

FIGURE 4 is an exploded view of a portion of the motor illustrating the printed rotor and the tachometer utilized in the motor control circuit of this invention;

FIGURE 4a is a partial sectional view illustrating the arrangement of the tachometer utilized in the motor control circuit of this invention; and FIGURE 5 is a series of curves illustrating the operation of the motor control circuit of this invention.

Referring first to FIGURES 3, 4 and 4a, a printed circuit direct-current motor 170 is depicted having a thin disc armature 180. The armature 180 has a large number of flat ribbon-like copper conductors printed on each of its faces. The conductors are a printed circuit equivalent of a multi-polar wave winding in a conventional motor. The motor illustratively may be of the type PM368 manufactured by the Photocircuits Corporation of Glen Cove, New York, having a maximum speed of 4500 revolutions per minute.

The armature 180 has an illustrative diameter of 3.5 inches and a weight of 2.5 ounces. The moment of inertia of the armature is accordingly quite small, illustratively 0.99 ounce-inches squared. The time required for the motor 170 to respond to a motor-input signal change is quite small because of the small armature moment of inertia and because the armature inductance, and therefore the electrical time constant of the armature, is quite small. The armature inductance may be so small that the input impedance may be considered as resistive. The response of the motor 170 may be more than 250 times as fast as conventional motors.

The armature 180 is supported by a clamp 181 on an armature shaft 182. The shaft 182 may be a capstan member for driving a magnetic tape, not shown. The shaft 182 is supported by spaced bearings 183 and 184 in a housing 185. The housing 185 also encloses a number of permanent magnets 187 which are positioned adjacent the armature 180. The successive magnets 187 have opposite polarities so that a magnetic circuit is formed from one magnet to the next through the armature 180 and a ring 188 made of magnetic material. The motor also includes a number of brushes, not shown, which may directly contact the conductors on the armature 180. Illustratively, there may be four such brushes.

In addition to the armature 180, the capstan shaft 182 also supports a rotor 190 of a tachometer 10. The rotor 190 is held against a bushing 195 by a nut 194 threaded over the end of the shaft 182. The rotor 190 forms a capacitive coupling with a toothed stator ring 191 which is mounted on the housing 185. Each of the rotor 190 and the stator ring 191 have a relatively large number of teeth, illustratively 350. The teeth in the rotor 190 and stator ring 191 of the tachometer 10 do not mesh but are positioned in a proximate concentric relationship to form a capacitive element. The capacity between the sets of teeth varies with small differences in relative angular orientation, with a maximum capacity being provided when the respective teeth are directly opposite each other and a minimum capacity being provided when the respective teeth are at a maximum separation. Rotation of the teeth on the rotor 190 relative to the teeth on the stator ring 191 will cause a capacity variation at a frequency dependent of the number of teeth and the speed of rotation. If each set has 350 teeth and the rotor 190 is being driven at a speed illustratively of 3000 r.p.m., the capacitance variation will occur at a frequency of 17.5 kilocycles per second.

A potential applied across the rotor 190 and stator ring 191 will provide for a charging current varying at the 17.5 kilocycle frequency. The signal from the tachometer 10 is utilized as is hereinafter described to control the speed of the motor 170.

Referring now to FIGURES 1 and 2, the tachometer 10 which is mounted on the motor 170 provides pulses indicative, as described above, of the instantaneous frequency of the motor 170. The pulses are provided from the tachometer 10 to a high impedance cathode follower tube 11 through a coupling capacitor 9. One plate of the capacitor 9 is coupled to the control grid of the tube 11 and the other plate of the capacitor 9 is coupled to the junction of a voltage divider formed by two resistors 13 and 14. The resistors 13 and 14 are serially connected between a positive potential source 12 and a ground connection. The positive potential source 12 is also connected to the anode and to the screen and suppressor grids of the vacuum tube 11. The cathode of the vacuum tube 11 is connected through two serially coupled resistors 16 and 17 to the ground connection, and the junction between the resistors 16 and 17 is connected to a resistor 15. The other connection to the resistor 15 is from the control grid of the vacuum tube 11. The connection through the resistor 15 functions as a positive feedback connection since the larger the current through the vacuum tube 11, the larger is the potential at the junction of the resistors 16 and 17.

The cathode follower stage, including the vacuum tube 11, functions to isolate the tachometer 10 from the rest of the circuitry shown in FIGURES 1 and 2 to prevent loading of the tachometer 10. The output of the cathode follower stage, which is substantially sinusoidal in waveform and at a nominal frequency of 17.5 kilocycles, is taken from the cathode of the vacuum tube 11 and coupled through a coupling capacitor 18 to the base electrode of a PNP junction transistor 25.

The junction transistor 25 is coupled in an emitter follower arrangement with its collector electrode being biased by a negative potential source 19 which is coupled thereto by a resistor 23. The resistor 23 is also connected to a smoothing or filter capacitor 149 so that the potential at the collector electrode of the transistor 25 is substantially constant. The biasing potential at the base electrode of the transistor 25 is determined by a voltage divider arrangement including a resistor 20, a resistor 21 and a rheostat 22 which are serially connected between the resistor 23 and the ground connection. The junctions of the resistors 20 and 21 are connected to the base electrode of the transistor 25. The particular biasing potential at the base electrode of the transistor 25 may readily be adjusted utilizing the rheostat 22. The emitter electrode of the transistor 25 is connected by an emitter resistor 26 to the ground connection. The emitter follower arrangement, including the transistor 25, is utilized to further increase the impedance between the tachometer 10 and a trigger arrangement including two transistors 28 and 35.

The two transistors 28 and 35 are both PNP junction transistors and they are coupled in a Schmidt trigger-circuit arrangement to convert the sinusoidal signal from the transistor 25 to a square wave. The sinusoidal signal from the emitter follower transistor 25 is introduced to the base electrode of the transistor 28. The emitter electrodes of the transistors 28 and 35 are both connected to a grounded resistor 32, and the base electrode of the transistor 35 is biased by a circuit arrangement including a resistor 29, a resistor 30 and a resistor 34. The three resistors 29, 30 and 34 are serially connected between the resistor 23 at the potential source 19 and a ground connection. The resistor 30 is shunted by a capacitor 31 which provides for a low impedance coupling between the collector electrode of the transistor 28 and the base electrode of the transistor 35 during the triggering intervals. The resistor 29 is also connected as a collector resistor for the transistor 28. The collector electrode of the transistor 35 is connected by a resistor 38 and a rheostat 37 to the resistor 23.

The rheostats 37 and the rheostat 22 described above, are utilized to adjust the triggering level of the Schmidt trigger arrangement including the two transistors 28 and 35. The Schmidt trigger arrangement is bistable as the transistor 28 becomes conductive for relatively negative input signals and the transistor 35 becomes conductive for relatively positive input signals. When the input signal is negative, the emitter-to-base junction of the transistor 28 becomes forward biased. The exact potential that the junction becomes forward-biased and the transistor 28 becomes conductive depends upon the current through the transistor 35 and the common emitter resistor 32. By adjusting the two rheostats 37 and 22, the trigger circuit arrangement may be set to trigger in one direction when the sinusoidal input crosses zero volts on increasing, and to trigger in the other direction when the sinusoidal input crosses zero volts decreasing.

The square waves at the instantaneous frequency of the tachometer signal are provided from the collector electrode of the transistor 35 through a coupling capacitor 39 to the base electrode of a transistor 40 which forms part of a square wave amplifier. The base electrode of the transistor 40, which is also a PNP junction transistor, is connected to a grounded resistor 41. The collector electrode of the transistor 40 is connected to the resistor 23 by a resistor 42.

The square waves from the amplifier transistor 40 are provided from the collector electrode of the transistor 40 through a coupling capacitor 43 to the primary winding 46 of a differentiating transformer 45. The primary winding 46 is a low inductance winding providing little reactance for low frequencies and a greater reactance for higher frequencies. Only the higher frequency signals, therefore, provide for a signal coupled through the transformer 45. The transformer 45 includes two identical secondary windings 47 and 48. Each of the secondary windings 47 and 48 is part of one of two substantially identical phase detectors 51 and 50. Each of the phase detectors 50 and 51 compares the differentiated signal derived from the tachometer 10 with a reference signal developed from an adjustable oscillator 70.

The oscillator 70 provides a constant frequency signal at a frequency which determines the speed of the motor 170. As is hereinafter described, the motor speed actually tracks the reference frequency signal from the oscillator 70. By varying the reference frequency, the speed of the motor 170, and the tachometer frequency are accordingly varied. In the above description of the tachometer 10, a signal having a frequency of 17.5 kilocycles was assumed. In order to provide a tachometer signal having a nominal frequency of 17.5 kilocycles, the frequency of the oscillator 70 is at 17.5 kilocycles. Illustratively, the frequency of the oscillator 70 is therefore assumed to be 17.5 kilocycles.

The signal from the tachometer 10 has an instantaneous frequency also of 17.5 kilocycles when the motor 170 is operating exactly at its operating speed. If the instantaneous speed of the motor 170 varies slightly either increasing or decreasing, the instantaneous frequency of the tachometer signal varies in one direction or the other from the nominal 17.5 kilocycle frequency. The reference frequency from the oscillator 70 may be sinusoidal in shape having a magnitude of from 20 volts from peak-to-peak. The 17.5 kilocycle signal from the oscillator 70 is introduced to a phase shifting network 71 which provides two signals both of a frequency of 17.5 kilocycles but at a 90 degree phase displacement from each other. One of the signals is provided to the phase detector 50 and the other of the signals is provided to the phase detector 51, both mentioned above. The signal to the phase detector 50 lags by 45 degrees the phase of the signal from the oscillator 70, and the signal to the phase detector 51 leads by 45 degrees the signal from the oscillator 70. The lagging signal is referred to herein as a sinusoidal signal and the leading signal is referred to as a cosine signal.

The 45 degree leading signal is developed by a capacitor 76 which is coupled between the oscillator 70 and a voltage divider consisting of two resistors 77 and 80. The resistors 77 and 80 are connected by a lead between the resistor 23, mentioned above, and the ground connection. The junction of the resistors 77 and 80 is connected to the phase detector 51. The parameters of the various components provide for the 45 degree phase shift with the capacitor being in series between the oscillator 70 and the detector 51.

The 45 degree lagging signal is developed by a circuit arrangement including a number of components; a capacitor 72, a resistor 73, a potentiometer 74, a capacitor 75, a resistor 78 and a capacitor 79. The capacitor 72 is relatively large, functioning as a coupling capacitor and is serially connected with the resistor 78 between the oscillator 70 and the detector 50. One terminal of the potentiometer 74 is grounded and it other terminal is connected to the resistor 73 and to the capacitor 72. A biasing potential is applied from the source 19 in this manner through the resistor 23 to the upper terminal of the potentiometer 74.

The center tap of the potentiometer 74 is coupled to the junction of the resistor 73 and the capacitor 75 which are serially connected between the resistor 23 and the ground connection. The capacitor 75 has a relatively large capacitance such as 50 microfarads and functions to effectively shunt the 17.5 kilocycle signals provided to the lower portion of the potentiometer 74 to ground. The 45 degree lag phase shift provided by the circuit 71 is determined essentially by the resistor 78 and the capacitor 79. The capacitor 79 has a capacitance similar to that of the capacitor 76 and may illustratively be 0.01 microfarads. The junction of the resistor 78 and the capacitor 79 is coupled to the phase detector 50 to provide the 45 lagging signal thereto.

Though the signals provided by the phase shifting circuit 71 are referred to as 45 leading and 45 lagging signals, the angular phase shift from the phase of the signal from the oscillator 70 varies with the frequency of the oscillator 70. The shifting circuit actually provides for two 90 degree out of phase signals for any frequency from the oscillator 70 but each may be shifted by more or less than 45 degrees from the phase of the reference signal. For example, if the frequency is increased, the leading phase shift increases and the lagging phase shift decreases but still maintaining the 90 degree separation.

The adjustment of the potentiometer 74 affects the D.C. level of the lagging signal because it introduces a D.C. component to the lagging reference signal. The potentiometer 74 is set to provide for the sampling of the lagging signal at its zero crossover point by the differentiated pulses derived from the tachometer signal. The sampling operation, which takes place in the detector 50, is hereinafter described.

As indicated above, the phase detectors 50 and 51 are similar with each receiving the same differentiated tachometer signal and each receiving one of the two 90 degree phase separated signals from the phase shifting network 71. The phase detector 50 includes two diodes 64 and 65 and two diodes 66 and 67 which are poled in a similar direction and connected in pairs across the winding 48. Actually, the winding 48 is serially connected with a resistor 62 which is shunted by a capacitor 63, and connected by the resistor 62 and capacitor 63 to the cathodes of the diodes 64 and 66. The lagging sinusoidal signal from the phase shifting network 71 is introduced to the junction of the diodes 64 and 65.

The peak-to-peak magnitude of the lagging sinusoidal signal is slightly less than 20 volts, and the short duration differentiated pulses across the winding 48 have a magnitude slightly greater than 20 volts. The positive differentiated pulses therefore tend to forward bias all four diodes 64 through 67 irrespective of their phase relationship with the sinusoidal signal. In effect, therefore, the short pulses function to switch on the detector 50 and to sample the lagging sinusoidal signal during the brief switched on interval.

The sinusoidal signal is applied to the junction of the diodes 64 and 65 so that when a forward biasing positive pulse is applied across the diodes 64 through 67, the junction of the diodes 66 and 67 assumes the same potential as the junction of the diodes 64 and 65. Assume illustratively that the motor speeds up a bit so that the instantaneous frequency of the tachometer signal increases. When the frequency of the tachometer signal increases, the differentiated positive pulses sample the sinusoidal signal from the network 71 first at successively greater amplitudes. When, as is hereinafter further described, the motor 170 is exactly on speed as determined by the oscillator 70, the differentiated pulses to the phase detector 50 occur at the zero crossover points of the lagging sinusoidal signal from the phase shifter 71. If the motor speed has increased therefore so that, for example, the frequency of the differentiated pulses are now 18 kilocycles per second instead of 17.5 kilocycles, the successive potentials at the output of the detector 50 become at first more and more positive, and then less positive varying at a 0.5 kilocycle rate. The output from the phase detector 50 is then a series of pulses spaced at a repetition rate equal to the instantaneous frequency of the tachometer signal. The output pulses, however, vary in amplitude at a frequency which is the beat or difference frequency between the instantaneous frequencies of the tachometer signal and the 45 degree lagging reference signal. The beat frequency signals are provided to a storage capacitor 87 so that the signal across the storage capacitor 87 is a substantially sinusoidal signal at the beat frequency. The wave shape is actually a series of fine high frequency steps with the instantaneous magnitude across the capacitor 87 changing at each comparison or sampling operation of the phase comparator or detector 50.

As described above, the sampling operation of the detector 50 occurs each time a positive differentiated pulse is coupled through the differentiating transformer 45. The negative differentiated pulses do not function as sampling pulses because they reverse bias all four diodes 64 and 67. Only one output pulse is therefore provided for each cycle of the tachometer signal.

The phase comparator 51 operates in a substantially similar way as does the phase comparator 50 except the reference signal introduced thereto is a cosine signal leading the sine signal to the comparator 50 by 90 degrees. The cosine signal is introduced from the phase shifter 71 to the junction of two diodes 54 and 55 in the comparator 51. The diodes 54 and 55 are serially connected and together shunt two serially connected diodes 56 and 57. The anodes of the diodes 54 and 56 are coupled to the secondary winding 47 by a resistor 52, with the resistor 52 being shunted by a capacitor 53. The output of the phase comparator 51 is then a series of pulses forming a sinusoidal signal at the beat frequency between the tachometer signal and the leading or cosine reference signal from the circuit 71. The output from the comparator 51 is provided from the junction of the diodes 56 and 57 across a storage capacitor 86. The storage capacitor 86 is similar to the storage capacitor 87 described above, at the output of the phase comparator 50.

With the sinusoidal beat frequency from the phase comparator 50 increasing at first when the motor speed increases, the cosine beat frequency from the phase comparator 56 decreases since it is leading the sinusoidal signal by 90 degrees. Reference to the curves for the two trigonometric functions shown in FIGURE 5 makes this relationship apparent. The sinusoidal beat frequency error signal and the cosine beat frequency error signal are provided to different paths or channels with the former being compensated for the characteristics of the particular motor and the latter being utilized to determine the direction as well as magnitude of the motor variation from its operating speed.

The sinusoidal and cosine signals are introduced respectively to emitter follower arrangements including the PNP transistors 90 and 85. The emitter electrodes of the transistors 90 and 85 are connected respectively to ground by emitter resistors 91 and 88, and the collector electrodes of the transistors 90 and 85 are connected directly to the resistor 23. The two emitter followers function to isolate the capacitors 86 and 87 from the succeeding channels which are hereinafter described. Considering first the channel for the cosine beat frequency signal from the capacitor 86, the emitter follower including the transistor 85 is connected to a succeeding emitter follower including a transistor 95. The emitter electrode of the transistor 85 is connected to the base electrode of the PNP junction transistor 95. The cosine frequency signal is, in this manner, coupled through the transistors 85 and 90 which serve to isolate the capacitor 86 and the phase detector 51 from a transformer 98. The output of the emitter follower transistor 95 is taken from its emitter electrode, which is connected to ground by an emitter resistor 96, and provided through a coupling capacitor 97 to the primary winding of the transformer 98. The other terminal of the primary winding of the transformer 98 is grounded. The capacitor 97 isolates D.C. potentials from the transformer 98 so that only the alternating current components of the beat frequency cosine signals from the phase comparator 51 are introduced to the transformer 98.

The cosine signals through the transformer 98 are introduced to a phase comparator 100 which is essentially similar to the phase comparators 50 and 51 described above. The phase comparator 100 includes the two pairs of diodes 103—104 and 105—106 which are similarly poled and coupled between the secondary of the transformer 98 and a resistor 102. The resistor 102 is shunted by a capacitor 101. The phase comparator 100 functions as a switch which is operative at the peaks of the cosine input signal through the transformer 98. The other input to the phase comparator 100 is derived as is hereinafter described, from the sinusoidal beat signal provided by the comparator 50.

As described above, the transistor 90 forms part of an emitter follower arrangement for isolating the comparator 50 and the storage capacitor 87 from the succeeding circuitry. The sinusoidal signal at the emitter electrode of the transistor 90 is provided through a resistor 92 to the base electrode of another emitter follower transistor 120. The base electrode of the transistor 120 is also connected to a grounded capacitor 119 which functions to smooth the sinusoidal signal so that the various small 17.5 kilocycle steps forming the wave shape are shunted to ground. The smoothed signal is developed by the transistor 120 across a resistor 121 and provided to a differentiating circuit 111. The emitter electrode of the transistor 120 is connected to the resistor 121, which is also connected to ground, and the emitter electrode is also connected to the circuit 111.

The differentiating circuit 111 includes a capacitor 109, a resistor 108 and a potentiometer 107. The potentiometer 107 is utilized to adjust the magnitude of the signal provided from the junction of the capacitor 109 and resistor 108 to the phase comparator circuit 100. The differentiating circuit 111 functions, in this manner, to convert the sinusoidal signal from the transistor 120 to a cosine signal since the differential of the sine function is a cosine function. The reason for this conversion is that the rate of change of the sine function, as indicated in FIGURE 5, is greatest at the cross-over point so that the differential is at a maximum at that time to form the cosine signal. The polarity of the signal introduced by the differentiating circuit 111 to the junction of the diodes 103 and 104 in the phase comparator circuit 100 with reference to the polarity of the cosine beat signal through the transformer 98, depends upon whether the instantaneous motor speed was greater or smaller than its normal operating speed as determined by the setting of the oscillator 70. The polarity of the differentiated signal with reference to the polarity of the cosine beat signal coupled through the transformer 98 indicates therefore the direction of the speed displacement of the motor 170. When the motor speed is greater than its normal operating speed, the two cosine signals (one through the transformer 98 and the other from the circuit 111) introduced to the phase comparator 100 are in phase and when the motor speed is smaller than its normal operating speed, the two cosine signals are out of phase.

The reason for this phase relationship becomes apparent upon a consideration of the curves illustrated in FIGURE 5. In FIGURE 5 the first two curves are the conventional trigonometric curves of the sine and cosine functions. The third curve illustrates the cosine signal from the circuit 111 for a slow motor and, in dashed form, for a fast motor. When the tachometer signal is at a lower instantaneous frequency than that of the reference sine signal, the sinusoidal beat signal from the comparator 50 is increasing when the cosine beat signal from the comparator 51 is at a maximum. However, the sinusoidal beat frequency is decreasing when the cosine beat signal is at a maximum for tachometer frequencies less than the reference frequency. The differential of the increasing sine signal is out of phase from the differential of the decreasing sine signal though both differentials may be referred to as cosine signals.

In this manner, the cosine signal from the differentiating circuit 111 is in phase with the cosine signal through the transformer 98 for fast motor speeds but is out of phase therewith for slow motor speeds. The output from the phase comparator 100, therefore, is a signal which indicates the direction of the motor speed variation from its operating speed. The comparator 100 functions essentially as a switch, being closed except at the positive peaks of the cosine signal through the transformer 98. The positive peaks of the cosine signal through the transformer forward bias all four diodes 103 through 106 inclusive. The potential provided at that time from the circuit 111 is positive if the tachometer frequency is high and the potential is negative if the tachometer signal is low.

The output of the phase comparator 100 is introduced to a storage capacitor 110 so that the polarity of the potential thereat depends upon the relative phase of the two signals introduced to the phase comparator 100 which in turn depends on whether the motor speed is too fast or too slow. The potential across the capacitor 110 remains constant as long as the direction of the motor speed variation does not change.

The storage capacitor 110 is coupled to an emitter follower transistor 112 having its collector electrode connected by a resistor 113 to the resistor 23. The emitter electrode of the transistor 112 is connected to the base electrode of a transistor 116 which functions as part of an amplifier. The collector electrode of the transistor 116 is biased by a circuit arrangement including a resistor 118, and the resistor 23. The emitter electrode is biased by a Zener diode 117 which is connected to ground. The Zener diode 117 functions to maintain the emitter potential at a constant value during the operation of the amplifier. Due to the phase reversal through the amplifier, its output is relatively positive for slow motor speeds and relatively negative for fast motor speeds.

The output from the amplifier is taken from the collector electrode of the transistor 116 and coupled through a resistor 137 to the anode of a Zener diode 131. The Zener diode 131 is shunted by a capacitor 134 which shunts alternating currents about the Zener diode 131 to a transistor 135. As is hereinafter described, the sine beat signal is introduced to the Zener diode through a transistor 130. The cathode of the Zener diode 131 is connected to the base electrode of the transistor 135 and to ground by a resistor 133. The output of the amplifier transistor 116 determines the level of the bias potential applied to the base electrode of the transistor 135. The D.C. potential at the collector of the transistor 116 is applied to a voltage divider arrangement including the resistor 137, the diode 131 and the resistor 133. The potential across the diode 131 is fixed, being determined by the diode characteristics. For slow motor speeds the bias potential is relatively positive so that the transistor 135 is less conductive. The reverse conditions exist for fast motor speeds. Both levels of potential from the transistor 116 maintain the diode 131 conductive.

As mentioned above, another signal is introduced to the transistor 135. The other signal is the sine beat signal which is modified by a compensating network 125. The network 125 compensates for the characteristics of the particular motor 170 which is being controlled by the motor control circuit depicted in FIGURES 1 and 2. As described above, the sine beat signal from the capacitor 87 at the output of the comparator 50 is coupled through the emitter follower transistors 90 and 120 to the differentiating circuit 111. The sine beat signal at the emitter electrode of the transistor 120 is also introduced through a leading network consisting of a capacitor 123 shunted by a resistor 122, which form part of the network 125, to the base electrode of the transistor 130. A lagging network is also coupled to the base electrode of the transistor 130, which network includes a capacitor 124 and a rheostat 126. The rheostat 126 is adjusted for the particular characteristics of the motor.

The response of the motor 170 varies at different speeds because of bearing friction, rotor inertia, etc., which are different at different speeds. The leading and lagging networks of the network 125 compensate for these variations being an electrical analog of a motor so as to in effect produce a linear motor response at the output of the network 125. The amplitude of the signals through the network 125, therefore indicates the compensation whereas the frequency indicates the speed variation. The signal, therefore, at the base electrode of the transistor 130 is an error signal at the beat frequency and derived from the sine reference signal which has been adjusted to compensate for variation of the motor characteristics with speed.

The transistor 130 forms an emitter follower arrangement for isolating the network 125 and has its emitter connected to the anode of the Zener diode 131 described above, and its collector electrode connected to the resistor 23. The compensated error signal effectively is shunted around the Zener diode 131 by the capacitor 134. As described above, the operating level of the transistor 135 is determined by the directional signal from the phase comparator 100. The transistor 135 forms part of an amplifier having its emitter electrode connected directly to ground, and its collector electrode connected by a resistor 138 and through the resistor 23 to the source of potential 19.

The output from the amplifier transistor 135 is filtered by a capacitor 132 which is connected between the collector electrode of the transistor 135 and a grounded resistor 136. The capacitor 132 is charged to a potential determined by the biasing potential from the transistor 116 and the frequency and amplitude of the compensated signal from the network 125.

The collector electrode of the transistor 135 is also connected to the base electrode of an emitter follower transistor 140 which isolates the capacitor 132. The base electrode of the transistor 140 is connected by a resistor 138 to the resistor 23, and its collector electrode is connected by a resistor 139 also to the resistor 23. A smoothing capacitor 147 is coupled to the collector electrode of the transistor 140 so that the output signal at its emitter electrode is substantially a D.C. potential for a fixed motor speed.

The emitter electrode of the transistor 140 is connected by a Zener diode 141 to the base electrode of another emitter follower transistor 145. The Zener diode 141 is shunted by a capacitor 142 and connected to ground by a resistor 143. The collector electrode of the transistor 145 is biased over a path including a resistor 150, and its emitter electrode is connected to ground by a resistor 148. The output at the emitter electrode of the transistor 145 is introduced to the base electrodes of two power transistors 171 and 172. The emitter electrodes of the transistors 171 and 172 are coupled respectively to ground by the resistors 174 and 173. The collector electrodes of the transistors 171 and 172 are coupled to the motor 170 which is being controlled by the motor control circuit. The other terminal of the motor 170 is connected to a negative potential source 175. In this manner, the conductivity of the transistors 171 and 172 is determined in accordance with the D.C. varying signal from the transistor 145 to control the motor speed.

As described above, the cosine beat signal from the comparator 51 is utilized to determine the direction of the motor speed variation. The cosine beat signal from the emitter follower transistor is also provided through a lead C and a resistor 156 to the base electrode of a PNP junction transistor 155. On each negative peak of the signal to the base electrode of the transistor 155, the transistor 155 becomes conductive to energize a relay winding 162. The winding 162 which is shunted by a capacitor 163 has one terminal connected to the collector electrode of the transistor 155, and its other terminal connected by a resistor 167 to the source 19. The collector electrode is also biased by a connection through a resistor 160 to ground. The emitter electrode of the transistor 155 is biased by two Zener diodes 158 and 159 which connect it to ground. The Zener diodes 158 and 159 provide a constant voltage on the emitter electrode of the transistor 155 as they are also connected by a resistor 157 to the source 19.

Due to the operation of the transistor 155, the relay winding 162 is operated once during each cycle of the cosine beat frequency. The relay winding is magnetically coupled to an armature 164 which normally completes a connection between a grounded resistor 165 and an indicator 178. Each time the winding 162, however, is energized, the armature 164 opens the connection to the indicator 178. The indicator 178 is also connected to the source 12 described above. The repetition rate of the relay operation provides, therefore, for an indication of the magnitude of the motor speed variation. If the motor is on speed an indication is not provided.

The following is a list of illustrative values for the various components utilized in the motor control circuit:

| Component | Unit | Value |
|---|---|---|
| Capacitor 9 | microfarads | 0.01 |
| Source 12 | volts | 300 |
| Resistor 13 | kilo-ohms | 1 |
| Resistor 14 | do | 4 |
| Resistor 15 | do | 4.7 |
| Resistor 16 | ohms | +300 |
| Resistor 17 | kilo-ohms | 5 |
| Capacitor 18 | microfarads | 0.001 |
| Source 19 | volts | −15 |
| Resistor 20 | kilo-ohms | 47 |
| Resistor 21 | do | 26.5 |
| Rheostat 22 | do | 1 |
| Resistor 23 | do | 0.5 |
| Resistor 26 | do | 26.5 |
| Resistor 29 | do | 2 |
| Resistor 30 | do | 47 |
| Capacitor 31 | micro-microfarads | 100 |
| Resistor 32 | kilo-ohms | 2 |
| Resistor 34 | do | 68 |
| Rheostat 37 | do | 5 |
| Resistor 38 | do | 1 |
| Capacitors 39 and 43 | microfarads | .01 |
| Resistors 41 and 42 | kilo-ohms | 2 |
| Resistors 52 and 62 | do | 100 |
| Capacitors 53, 63 and 72 | microfarads | 0.25 |
| Capacitors 76 and 79 | do | 0.01 |
| Potentiometer 74 | kilo-ohms | 100 |
| Capacitor 75 | microfarads | 50 |
| Resistors 77 and 80 | kilo-ohms | 2 |
| Resistor 78 | ohms | 820 |
| Capacitors 86 and 87 | microfarads | 0.004 |
| Resistor 88 | kilo-ohms | 24 |
| Resistor 91 | do | 47 |
| Resistor 92 | do | 6.8 |
| Resistor 96 | ohms | 680 |
| Capacitor 97 | microfarads | 0.01 |
| Capacitor 101 | do | 0.25 |
| Resistor 102 | kilo-ohms | 100 |
| Potentiometer 107 | do | 5 |
| Resistor 108 | do | 27 |
| Capacitor 109 | microfarads | 0.01 |
| Capacitor 110 | do | 1 |
| Resistor 113 | ohms | 120 |
| Resistor 115 | kilo-ohms | 1.5 |
| Resistor 118 | ohms | 470 |
| Capacitor 119 | microfarads | 1500 |
| Resistor 121 | ohms | 330 |
| Capacitor 123 | microfarads | 0.1 |
| Resistor 122 | kilo-ohms | 22 |
| Capacitor 124 | microfarads | 18 |
| Rheostat 126 | kilo-ohms | 10 |
| Capacitor 132 | microfarads | 0.08 |
| Resistor 136 | ohms | 500 |
| Resistor 133 | do | 180 |
| Capacitor 134 | microfarads | 25 |
| Resistor 137 | kilo-ohms | 3.8 |
| Resistor 138 | do | 1.8 |
| Resistor 139 | ohms | 120 |
| Capacitor 142 | microfarads | 0.015 |
| Capacitor 147 | do | 25 |
| Resistor 148 | ohms | 270 |
| Capacitor 149 | microfarads | 100 |
| Resistor 150 | ohms | 10 |
| Transistor 155 | | 2N599 |
| Resistor 156 | kilo-ohms | 1.5 |
| Resistor 157 | do | 1 |
| Resistor 160 | ohms | 680 |
| Winding 162 | do | 40 |
| Capacitor 163 | microfarads | 1000 |
| Resistor 165 | kilo-ohms | 4.7 |
| Resistor 167 | ohms | 47 |
| Resistors 173 and 174 | do | 0.5 |
| Source 175 | volts | −20 |

Although this application has been disclosed and illustrated with reference to particular applications, the principles involved are susceptible of numerous other applications which will be apparent to persons skilled in the art. For example, as indicated above, the particular values for the various components are merely illustrative. The invention is therefore to be limited only as indicated by the scope of the appended claims.

I claim:

1. A control circuit for a motor including a tachometer generator for developing a signal having an instantaneous frequency indicative of the instantaneous speed of a motor, a source of a reference signal having a frequency determining the speed of the motor, phase shifting means coupled to said source for developing two quadrature signals, phase comparison means coupled to said phase shifting means and to said tachometer generator for comparing the phase of each of said two quadrature signals with the phase of said signal developed by said tachometer generator to develop two quadrature beat signals, means coupled to said phase comparison means for combining the two quadrature beat signals to determine the direction of the motor speed variation and for producing a signal indicating such direction, and means coupled to said combining means and said phase comparison means for adding the direction indicating signals to one of said quadrature beat signal to provide a composite signal indicating both the direction and magnitude of the motor speed variation.

2. In combination for regulating the speed of a motor, means coupled to the motor for generating two signals having frequencies related to the speed of the motor, a source of two quadrature reference signals for determining the speed of the motor, means coupled to said generating and to said source for comparing the phases of said quadrature reference signals with the phases of said generated signals to develop two quadrature beat frequency signals each indicating the magnitude of the variation of the motor speed from the determined speed, and means coupled to said comparing means for combining said two quadrature beat frequency signals to determine the direction of the motor speed variation.

3. In combination for regulating the speed of a motor, means coupled to the motor for generating two signals having frequencies related to the speed of the motor, a source of two quadrature reference signals for determining the speed of the motor, means coupled to said generating and to said source for comparing the phases of said quadrature reference signals with the phases of said generated signals to develop two quadrature beat frequency signals each indicating the magnitude of the variation of the motor speed from the determined speed, means coupled to said comparing means for combining said two quadrature beat frequency signals to determine the direction of the motor speed variation, and frequency responsive means coupled to said comparing means for varying the amplitude of one of said beat signals in accordance with the characteristics of the motor at different frequencies.

4. A control circuit for a motor including a tachometer generator for developing a signal having an instantaneous frequency indicative of the instantaneous speed of a motor, a source of a reference signal having a frequency determining the speed of the motor, phase shifting means coupled to said source for developing two quadrature signals, phase comparison means coupled to said phase shifting means and to said tachometer generator for comparing the phase of each of said two quadrature signals with the phase of said signal developed by said tachometer generator to develop two quadrature beat signals, means coupled to said phase comparison means for combining the two quadrature beat signals to determine the direction of the motor speed variation and for producing a signal indicating such direction, frequency responsive means coupled to said phase comparison means for varying the amplitude of one of said quadrature beat signals in accordance with the characteristics of the motor at different frequencies, and means coupled to said combining means and to said frequency responsive means for adding the direction indicating signals to varying amplitude beat signals from said frequency responsive means to provide a composite signal compensated for variations of the motor characteristics and indicating both the direction and magnitude of the motor speed variation.

5. A control circuit for a motor including a tachometer generator for developing a signal having an instantaneous frequency indicative of the instantaneous speed of a motor, a source of a reference signal having a frequency determining the speed of the motor, phase shifting means coupled to said source for developing two quadrature signals, phase comparison means coupled to said phase shifting means and to said tachometer generator for comparing the phase of each of said two quadrature signals with the phase of said signal developed by said tachometer generator to develop two quadrature beat signals, means coupled to said phase comparison means for differentiating one of said two quadrature beat signals, phase comparison means for comparing the phase of the other of said two quadrature signals with the phase of the differentiated quadrature signals to provide a signal indicative of the direction of motor speed variation, and means coupled to said second-mentioned phase comparison means for combining the signal indicative of the direction of motor speed variation with the one quadrature signal from said first-mentioned phase comparison means to provide a composite signal indicating both the direction and magnitude of the motor speed variation.

6. A control circuit for a motor including a tachometer generator for developing a signal having an instantaneous frequency indicative of the instantaneous speed of a motor, a source of a reference signal having a frequency determining the speed of the motor, phase shifting means coupled to said source for developing two quadrature signals, phase comparison means coupled to said phase shifting means and to said tachometer generator for comparing the phase of each of said two quadrature signals with the phase of said signal developed by said tachometer generator to develop two quadrature beat signals, means coupled to said phase comparison means for differentiating one of said two quadrature beat signals, phase comparison means for comparing the phase of the other of said two quadrature signals with the phase of the differentiated quadrature signals to provide a signal indicative of the direction of motor speed variation, frequency responsive means coupled to said first-mentioned phase comparison means for amplitude modulating said other quadrature signal in accordance with the characteristics of the motor at different frequencies, and means coupled to said second-mentioned phase comparison means for combining the signal indicative of the direction of motor speed variation with the amplitude modulated signal from said frequency responsive means to provide a composite signal indicating the direction and magnitude of the motor speed variation and also being compensated in accordance with the motor characteristics.

7. In combination for regulating the speed of a motor, means coupled to the motor for generating two signals having frequencies related to the speed of the motor, a source of two quadrature reference signals for determining the speed of the motor, means coupled to said generating and to said source for comparing the phases of said quadrature reference signals with the phases of said generated signals to develop two quadrature beat frequency signals each indicating the magnitude of the variation of the motor speed from the determined speed, means coupled to said comparing means for varying the amplitude of one of said quadrature beat frequency signals in accordance with the frequency characteristic of the motor, means coupled to said varying means for combining the amplitude varied signals with the other of said quadrature beat frequency signals, and means coupled to said combining means for introducing the combined signals to the motor for controlling the speed of the motor.

8. In combination, a low inertia, fast response direct current motor having a printed armature, and a shaft supporting said armature, a tachometer generator coupled to said shaft for generating a series of pulses having an instantaneous repetition rate indicative of the instantaneous speed of the fast response direct current motor, a frequency adjustable source of a reference signal for determining the speed of the motor, a phase shifting circuit coupled to said source for phase shifting said reference signal to develop two 90 degree out-of-phase sinusoidal signals each having the same frequency as the frequency of the reference signal, means coupled to said phase shifting circuit and to said tachometer generator for sampling each of said two sinusoidal signals at the repetition rate of said series of pulses from said tachometer generator to develop two series of pulses having magnitudes changing at the beat frequency between said series of pulses from said tachometer generator and the sinusoidal signals from said phase shifting network, the magnitudes of the two beat frequency series of pulses varying 90 degrees out-of-phase with each other, differentiating means coupled to said sampling means for providing a signal indicating the rate of change of the envelope of one of the beat frequency series of pulses from said sampling means, and a phase comparator for comparing the phase of the rate of change indicating signal from said differentiating means with the phase of the envelope of the other of the beat frequency series of pulses from the sampling means to determine the direction of any motor speed deviation from the speed determined by the setting of said frequency adjustable source.

9. In combination, a low inertia, fast response direct current motor having a printed armature, and a shaft supporting said armature, a tachometer generator coupled to said shaft for generating a series of pulses having an instantaneous repetition rate indicative of the instantaneous speed of the fast response direct current motor, a frequency adjustable source of a reference signal for determining the speed of the motor, a phase shifting circuit coupled to said source for phase shifting said reference signal to develop two 90 degree out-of-phase sinusoidal signals each having the same frequency as the frequency of the reference signal, means coupled to said phase shifting circuit and to said tachometer generator for sampling each of said two sinusoidal signals at the repetition rate of said series of pulses from said tachometer generator to develop two series of pulses having magnitudes changing at the beat frequency between said series of pulses from said tachometer generator and the sinusoidal signals from said phase shifting network, the magnitudes of the two beat frequency series of pulses varying 90 degrees out-of-phase with each other, differentiating means coupled to said sampling means for providing a signal indicating the rate of change of the envelope of one of the beat frequency series of pulses from said sampling means, means coupled to said differentiating means for combining the two quadrature beat signals to determine the direction of the motor speed variation and for producing a signal indicating such direction, and means coupled to said combining means and said sampling means for adding the direction indicating signals to one of said quadrature beat signals to provide a composite signal indicating both the direction and magnitude of the motor speed variation.

10. In combination, a low inertia, fast response direct current motor having a printed armature, and a shaft supporting said armature, a tachometer generator coupled to said shaft for generating a series of pulses having an instantaneous repetition rate indicative of the instantaneous speed of the fast response direct current motor, the instantaneous repetition rate of the generated series of pulses being greater than 10,000 pulses per second for normal operating speeds of the motor, a frequency adjustable source of a reference signal for determining the speed of the motor, the frequencies of the reference signal being variable in a range between 10,000 and 30,000 cycles per second, phase shifting means coupled to said source for developing two quadrature signals, phase comparison means coupled to said phase shifting means and to said tachometer generator for comparing the phase of said signal developed by said tachometer generator to develop two quadrature beat signals, means coupled to said phase comparison means for combining the two quadrature beat signals to determine the direction of the motor speed variation and for producing a signal indicating such direction, and means coupled to said combining means and said phase comparison means for adding the direction indicating signals to one of said quadrature beat signals to provide a composite signal indicating both the direction and magnitude of the motor speed variation.

11. In combination, a low inertia, fast response direct current motor having a printed armature, and a shaft supporting said armature, a tachometer generator coupled to said shaft for generating a series of pulses having an instantaneous repetition rate indicative of the instantaneous speed of the fast response direct current motor, a frequency adjustable source of a reference signal for determining the speed of the motor, a phase shifting circuit coupled to said source for phase shifting said reference signal to develop two 90 degree out-of-phase sinusoidal signals each having the same frequency as the frequency of the reference signal, means coupled to said phase shifting circuit and to said tachometer generator for sampling each of said two sinusoidal signals at the repetition rate of said series of pulses from said tachometer generator to develop two series of pulses having magnitudes changing at the beat frequency between said series of pulses from said tachometer generator and the sinusoidal signals from said phase shifting network, the magnitudes of the two beat frequency series of pulses varying 90 degrees out-of-phase with each other, differentiating means coupled to said sampling means for providing a signal indicating the rate of change of the envelope of one of the beat frequency series of pulses from said sampling means, a phase comparator for comparing the phase of the rate of change indicating signal from said differentiating means with the phase of the envelope of the other of the beat frequency series of pulses from the sampling means to determine the direction of any motor speed deviation from the speed determined by the setting of said frequency adjustable source, and frequency responsive means coupled to said sampling means for adjusting the amplitude and phase of the envelope of said other beat frequency series of pulses to compensate for any non-linearities of the response of the motor.

<center>No references cited.</center>